S. D. REYNOLDS.
Thrashing Machine.
No. 21,214.
Patented Aug. 17, 1858.
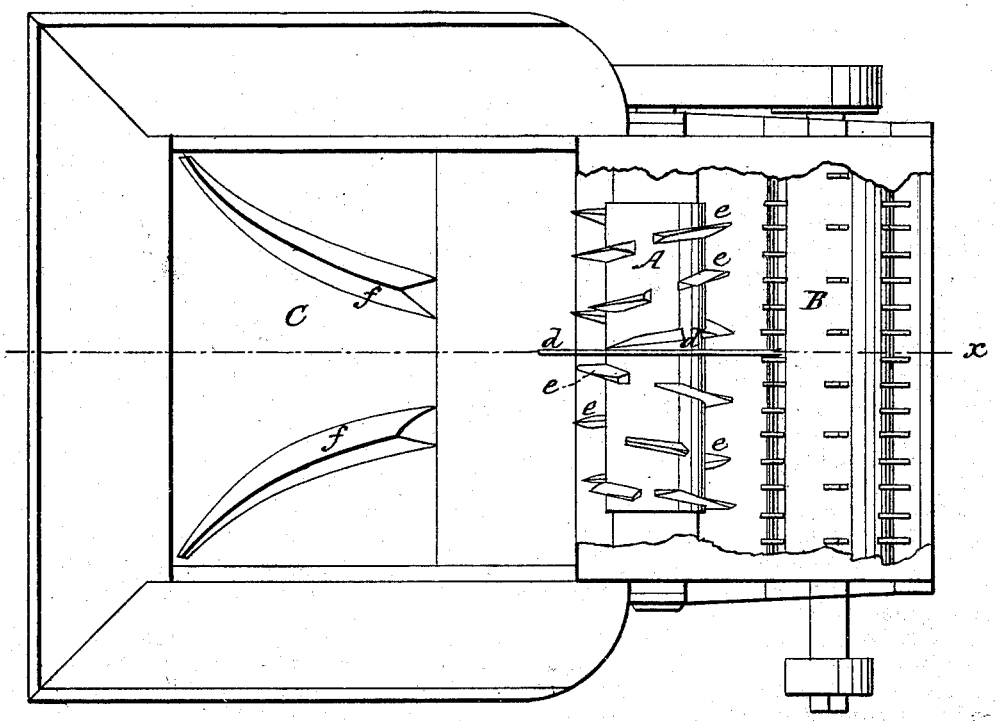
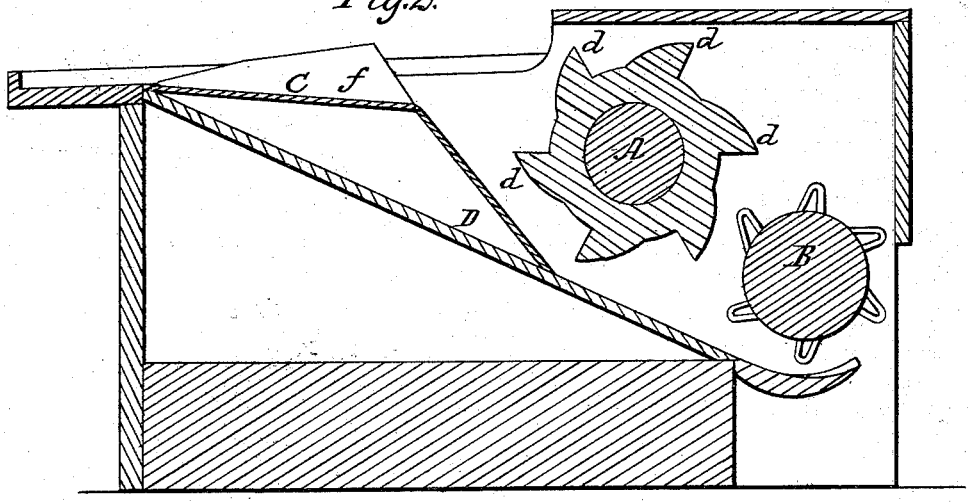

UNITED STATES PATENT OFFICE.

SAMUEL D. REYNOLDS, OF LANE, ILLINOIS.

IMPROVEMENT IN THRASHING-MACHINES.

Specification forming part of Letters Patent No. 21,214, dated August 17, 1858.

*To all whom it may concern:*

Be it known that I, SAMUEL D. REYNOLDS, of Lane, in the county of Ogle and State of Illinois, have invented a new and useful Improvement in Thrashing-Machines; and I do hereby declare that the following is a full and exact description thereof, reference being had to the accompanying drawings, making a part of this specification.

Figure 1 is a top view of my improved thrashing-machine, with a portion of the casing removed, and Fig. 2, a section in the line $x\,x$ of Fig. 1.

In using the thrashing-machines heretofore constructed, so far as my knowledge extends, the bands of the sheaves invariably have to be cut before their contents can be fed into said machines, which operation adds very considerably to the amount of manual labor required in operating that class of labor-saving machinery. To obviate the necessity for the said preliminary band-cutting and enable the sheaves of wheat or other grain to be fed directly into a thrashing-machine is the object of my present invention. This I accomplish by placing in suitable bearings a cutting and spreading cylinder A immediately in front of the thrashing-cylinder B of a thrashing-machine and imparting a rotary motion to the said cutting and spreading cylinder by any suitable means, either by banding or gearing.

The band-cutting in my improved thrashing-machine is performed by a series of blades $d\,d$, which radiate from the central portion of the cylinder A, and whose cutting-edges may be of such a shape as will enable them to perform their work in the most perfect manner. The instant after the bands of the sheaves are severed by the cutting-blades $d\,d$, the spirally-arranged teeth $e\,e$ of the cylinder A take hold of the loosened stalks of grain and spread them out uniformly over the inclined apron D, which conducts them to the teeth of the thrashing-cylinder B.

The platform C, which receives the sheaves of grain-stalks as they are fed into the machine, may be combined with the inclined apron D in such a manner that its position may be so adjusted as to bring it within any desired distance of the blades and teeth of the cylinder A. The sheaves, as they are placed upon the platform C, are guided as they are pressed forward directly to the band-cutting blades of the cylinder A by means of a flaring channel formed by the ledges $f\,f$, which rise from the upper surface of said platform, as shown in the drawings.

I do not intend to limit myself to a single series of band cutting blades upon the periphery of the cylinder A, for the reason that I may find it expedient to combine several series of cutting-blades and spreading teeth with the periphery of said cylinder. The said cutting and spreading cylinder may be used in conjunction with any description of thrashing-cylinder.

What I claim as my invention, and desire to secure by Letters Patent, is—

Arranging a band-cutting and stalk-spreading cylinder with the thrashing-cylinder of a thrashing-machine, substantially in the manner herein set forth.

The above specification of my band-cutting and grain-spreading attachment to thrashing-machines signed and witnessed this 10th day of June, 1858.

SAMUEL D. REYNOLDS.

Witnesses:
SAMUEL HAMAKER,
SILVESTER SUTTON.